United States Patent
Kasazaki

(10) Patent No.: US 12,000,362 B2
(45) Date of Patent: Jun. 4, 2024

(54) ENGINE

(71) Applicant: YANMAR HOLDINGS CO., LTD., Osaka (JP)

(72) Inventor: Shinsuke Kasazaki, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/048,290

(22) Filed: Oct. 20, 2022

(65) Prior Publication Data

US 2023/0145865 A1    May 11, 2023

(30) Foreign Application Priority Data

Nov. 5, 2021   (JP) ................ 2021-180903

(51) Int. Cl.
| | | |
|---|---|---|
| *F02M 26/04* | (2016.01) | |
| *F02M 26/10* | (2016.01) | |
| *F02M 26/15* | (2016.01) | |

(52) U.S. Cl.
CPC ............ *F02M 26/04* (2016.02); *F02M 26/10* (2016.02); *F02M 26/15* (2016.02)

(58) Field of Classification Search
CPC ......... F02M 26/04; F02M 26/10; F02M 26/15
See application file for complete search history.

(56) References Cited

U.S. PATENT DOCUMENTS

| | | |
|---|---|---|
| 6,945,048 B2 | 9/2005 | Whiting |
| 2018/0030875 A1 | 2/2018 | Kamo et al. |

FOREIGN PATENT DOCUMENTS

| | | | | |
|---|---|---|---|---|
| CN | 201635807 U | * | 11/2010 | |
| CN | 109072740 A | * | 12/2018 | ............. F01M 11/02 |
| JP | 2013-000002 A | | 1/2013 | |
| WO | WO2005042940 A2 | | 5/2005 | |

OTHER PUBLICATIONS

Machine Translation of CN109072740A PDF File Name: "CN109072740A_Machine_Translation.pdf".*
Machine Translation of CN201635807U PDF File Name: "CN201635807U_Machine_Translation.pdf".*
Extended European Search Report for Patent App. No. 22205498.3 (dated Mar. 6, 2023).

* cited by examiner

*Primary Examiner* — Grant Moubry
*Assistant Examiner* — Ruben Picon-Feliciano
(74) *Attorney, Agent, or Firm* — Future IP LLC; Tomoko Nakajima

(57) ABSTRACT

An engine is equipped with an engine body, a turbocharger, an exhaust gas purifier, an exhaust communication pipe. The turbocharger is connected to the engine body. The exhaust gas purifier purifies exhaust gas discharged from the turbocharger. The exhaust communication pipe connects the turbocharger with the exhaust gas purifier. The exhaust communication pipe includes: a first connection member that is connected to the turbocharger, and a second connection member that connects the first connection member with the exhaust gas purifier. A downstream end portion of the first connection member has an inner peripheral face having a cross-section of a circular shape. An upstream end portion of the first connection member has an inner peripheral face having a cross-section of an abnormal-shape that is different from the inner peripheral face of the downstream end portion.

9 Claims, 9 Drawing Sheets

ENGINE

TECHNICAL FIELD

The present invention relates to an engine.

BACKGROUND ART

A conventional engines is known to be equipped with an engine body, a turbocharger connected to the engine body, an after-treatment unit that purifies exhaust gas discharged from the turbocharger, and an exhaust communication pipe connecting the turbocharger with the after-treatment unit (see, for example, Patent Document 1). Patent Document 1 describes a harvester equipped with an engine body, a turbocharger, an exhaust gas purifier that purifies exhaust gas discharged from the turbocharger, and an exhaust pipe connecting the turbocharger with the exhaust gas purifier.

PRIOR ART DOCUMENT

Patent Document

Patent Document 1: Japanese Unexamined Patent Application Publication No. 2013-000002

SUMMARY OF INVENTION

Technical Problem

By the way, the turbocharger described in Patent Document 1 has an exhaust pipe connection portion that is connected to an exhaust pipe. Typically, a gas flow path at the exhaust pipe connection portion is circular in shape. In other words, the exhaust pipe connection portion has an inner peripheral face having a cross-section in a circular shape.

However, the exhaust pipe connection portion, as the case may be, has the inner peripheral face having an abnormally shaped cross-section that is different from the circular shape. In this case, forming the gas flow path of the exhaust pipe in the abnormal shape increases a pressure loss seen when the exhaust gas passes through the gas flow path of the exhaust pipe.

In view of the above issue, the present invention has been made; therefore, it is an object of the present invention to provide an engine capable of suppressing a larger pressure loss in an exhaust communication pipe connecting a turbocharger with an after-treatment unit.

Solution to Problem

An engine according to an aspect of the present invention includes: an engine body, a turbocharger, an exhaust gas purifier, an exhaust communication pipe. The turbocharger is connected to the engine body. The exhaust gas purifier purifies exhaust gas discharged from the turbocharger. The exhaust communication pipe connects the turbocharger with the exhaust gas purifier. The exhaust communication pipe includes: a first connection member that is connected to the turbocharger, and a second connection member that connects the first connection member with the exhaust gas purifier. A downstream end portion of the first connection member has an inner peripheral face having a cross-section of a circular shape. An upstream end portion of the first connection member has an inner peripheral face having a cross-section of an abnormal-shape that is different from the inner peripheral face of the downstream end portion.

Advantageous Effects of Invention

The present invention can provide an engine capable of suppressing a larger pressure loss in an exhaust communication pipe connecting a turbocharger with an after-treatment unit.

DESCRIPTION OF EMBODIMENTS

Figure 1:
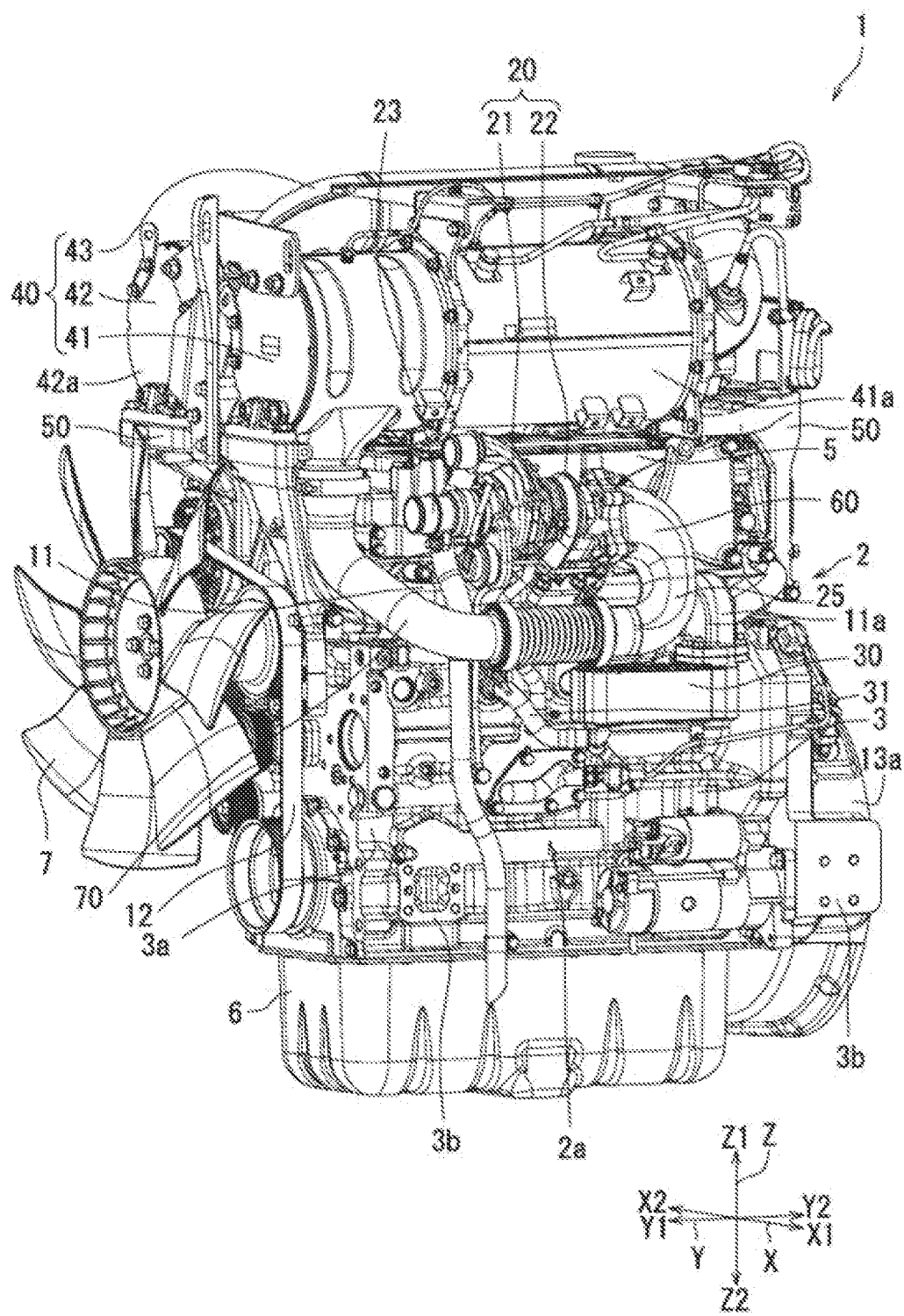
FIG. 1 is a perspective view showing, from the front, a configuration of an engine of one embodiment of the present invention.

The following is a description of an embodiment of an engine according to the present invention, referring to the drawings. Note that, in the drawings, the same reference signs are used for the same or equivalent components, and repeated descriptions are omitted. In the present specification, for ease of understanding, a first direction X, a second direction Y, and a third direction Z, which intersect each other, are used as appropriate. The first and second directions X and Y are substantially parallel to the horizontal direction, and the third direction Z is substantially parallel to the vertical direction. In the present specification, the first direction X, second direction Y, and third direction Z are orthogonal to each other, but may not be orthogonal. Hereinafter, one side X1 in the first direction X indicates the left side of the engine, and another side X2 in the first direction X indicates the right side face of the engine. Further, one side Y1 in the second direction Y indicates the front side of the engine, and another side Y2 in the second direction Y indicates the rear side of the engine. Further, one side Z1 in the third direction Z indicates the upper side, and another side Z2 in the third direction Z indicates the lower side. However, the left-right, front-rear, and up-down directions are defined only for convenience of description, and do not limit the orientation of the engine in use and assembly.

Referring to FIGS. 1 through 9, an engine 1 according to one embodiment of the present invention is described. FIG.

Figure 2:
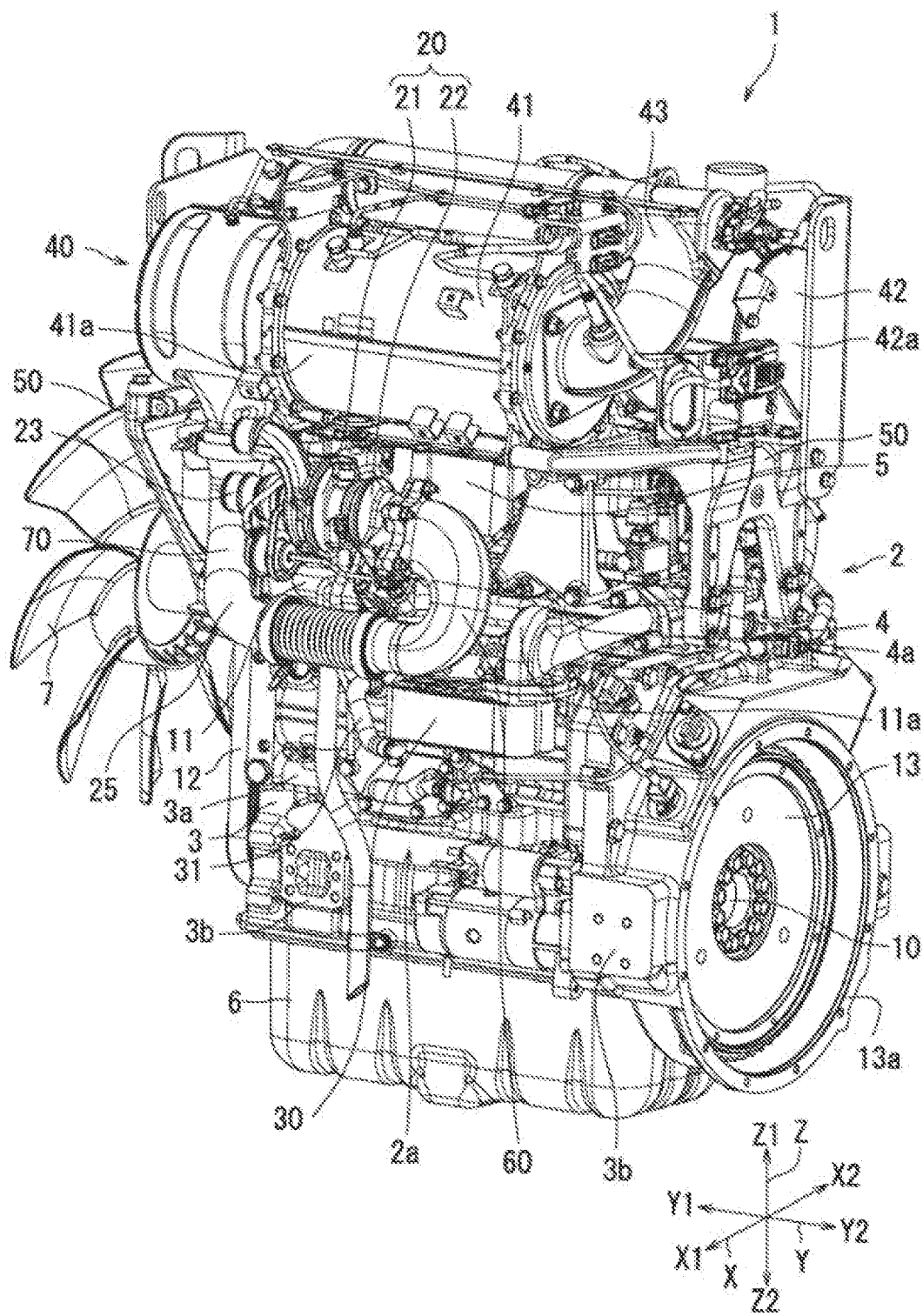
FIG. 2 is a perspective view showing, from the rear, the configuration of the engine of the one embodiment of the present invention.

1 is a perspective view showing, from the front, a configuration of the engine 1 of the one embodiment of the present invention. FIG. 2 is a perspective view showing, from the rear, the configuration of the engine 1 of the one embodiment of the present invention. The engine 1 is installed on a work machine such as agricultural machine, construction machine, and civil engineering machine, for example.

As shown in FIGS. 1 and 2, the engine 1 has an engine body 2, an oil pan 6, a cooling fan 7, a crankshaft 10. The engine body 2 includes a left side portion 2a. The left side portion 2a is an example of the "first side portion" of the present invention. The engine body 2 includes a combustion chamber (not shown), a cylinder block 3, a cylinder head 4, and a head cover 5.

The crankshaft 10 is placed inside the cylinder block 3. The crankshaft 10 is an output shaft. The crankshaft 10 is placed along the front-rear direction. Both end portions of the crankshaft 10 protrude externally from the cylinder block 3.

The cylinder block 3 includes a right side face (not shown), a left side face 3a, and a mounting portion 3b. The mounting portions 3b are placed on the front and rear portions on each of the right and left side faces 3a of the cylinder block 3. With a bolt, the mounting portion 3b is fixed to a chassis (not shown) of a work machine through a vibration-proof member such as rubber.

The cylinder head 4 is placed above the cylinder block 3. The engine 1 is further equipped with an intake manifold (not shown) and an exhaust manifold 11. The intake manifold is placed on the right side face (not shown) of the cylinder head 4. The intake manifold supplies air to each cylinder (not shown) of the engine body 2. The exhaust manifold 11 is placed on a left side face 4a (see FIG. 2) of the cylinder head 4. The exhaust manifold 11 is connected to the cylinder head 4. Exhaust gas is discharged from cylinder head 4 to the exhaust manifold 11.

The head cover 5 is placed above the cylinder head 4, covering the top of the cylinder head 4.

The oil pan 6 is placed below the engine body 2. That is, the oil pan 6 is placed below the cylinder block 3. The oil pan 6 stores a lubricating oil. After being supplied to each part of the engine 1, the lubricating oil in the oil pan 6 returns to the oil pan 6.

The cooling fan 7 is placed in front of the engine body 2. The engine 1 is further equipped with a belt 12 placed in front of the engine body 2. To the cooling fan 7, a rotational drive power is transmitted from the front end portion of the crankshaft 10 via the belt 12.

The engine 1 is further equipped with a flywheel 13 and a flywheel housing 13a. The flywheel housing 13a is placed at the rear of the engine body 2. The flywheel housing 13a houses the flywheel 13. The flywheel 13 is mounted to the rear end portion of the crankshaft 10. The rotational drive power of the crankshaft 10 is transmitted to an actuator of the work machine via the flywheel 13.

Referring to FIGS. 1 and 2, the configuration around the engine body 2 will be described. The engine 1 is further equipped with a turbocharger 20, an intake pipe 23, a turbocharger pipe (not shown), and an exhaust communication pipe 25. The turbocharger 20 increases the pressure of the air supplied to the engine body 2. The turbocharger 20 is placed on the left side of the head cover 5. In other words, the turbocharger 20 is placed on the left side portion 2a of the engine body 2. The turbocharger 20 includes a compressor case 21 and a turbine case 22. The compressor case 21 incorporates a blower wheel (not shown). The turbine case 22 houses a turbine wheel (not shown).

The intake pipe 23 is connected to an intake air inlet of compressor case 21. The turbocharger pipe is connected to an intake air outlet of the compressor case 21.

In the left side face 4a of the cylinder head 4, the exhaust manifold 11 extends from the front portion to the rear. The exhaust manifold 11 is connected to an exhaust inlet of the turbine case 22. The exhaust communication pipe 25 is connected to an exhaust outlet of the turbine case 22. The exhaust communication pipe 25 is connected to a tail pipe (not shown) via an exhaust gas purifier 40 described below. Accordingly, the exhaust gas discharged from each cylinder (not shown) of the engine body 2 to the exhaust manifold 11 is discharged via the turbocharger 20's turbine case 22, the exhaust communication pipe 25, the exhaust gas purifier 40, and the tail pipe, etc. to the outside. The detailed configuration around the exhaust communication pipe 25 is to be described below.

The engine 1 is further equipped with the exhaust gas purifier 40 and a support member 50. The exhaust gas purifier 40 is an example of an "after-treatment unit" of the present invention. The exhaust gas purifier 40 collects a particulate matter and the like in the exhaust gas. The exhaust gas purifier 40 is fixed to the engine body 2. In the present embodiment, the exhaust gas purifier 40 is fixed to the engine body 2 via the support member 50. The exhaust gas purifier 40 is placed above the engine body 2. Specifically, a pair of support members 50 is provided, for example. The support members 50 are placed at the front and rear portions of the engine 1, respectively. With a screw, the support member 50 is fixed to the cylinder head 4. The support member 50 supports the exhaust gas purifier 40.

In the present embodiment, the exhaust gas purifier 40 is fixed to the engine body 2, as described above. Thus, with the exhaust gas purifier 40 fixed to the engine body 2, the engine 1 can be fixed to the chassis (not shown) of the work machine. Thus, compared with the case of fixing the engine body 2 and the exhaust gas purifier 40 to the chassis (not shown) of the work machine in a separated manner, for example, the installation work of the engine 1 can be simplified.

Removing NOx, CO, HC, and a particulate matter, for example, included in the exhaust gas, the exhaust gas purifier 40 purifies the exhaust gas. The exhaust gas purifier 40 has a DPF (Diesel Particulate Filter) unit 41, an SCR (Selective Catalytic Reduction) unit 42, and a connecting pipe 43. The DPF unit 41 has, for example, a substantially cylindrical case 41a, and an oxidation catalyst and a filter which are housed in the case 41a. The oxidation catalyst and the filter reduce the NOx, HC, CO, and the particulate matter which are included in the exhaust gas.

The SCR unit 42 has, for example, a substantially cylindrical case 42a, and an SCR catalyst and an oxidation catalyst which are housed in the case 42a. The SCR catalyst and the oxidation catalyst reduce NOx included in the exhaust gas.

The DPF unit 41 is placed on the left side above the engine body 2, and the SCR unit 42 is placed on the right side above the engine body 2. The connecting pipe 43 connects the DPF unit 41 with the SCR unit 42. In the present embodiment, the connecting pipe 43 connects the rear portion of the DPF unit 41 with the front portion of the SCR unit 42. The exhaust gas flows from the front portion to rear portion of the DPF unit 41, then flows through the connecting pipe 43 into the SCR unit 42, and flows from the front portion toward the rear portion of the SCR unit 42. Then, the exhaust gas is discharged to the outside through an exhaust pipe (not shown) connected to the SCR unit 42.

The engine 1 is further equipped with an EGR (Exhaust Gas Recirculation) cooler 30 and a cooling water outlet pipe 31. The exhaust manifold 11 extends to the rear end portion of the left side face 4a of the cylinder head 4. A rear end portion 11a of the exhaust manifold 11 is connected to the EGR cooler 30. The exhaust gas's part in the exhaust manifold 11 is sent to the EGR cooler 30. The cooling water outlet pipe 31 is connected to the left side face 3a of the cylinder block 3. To the cooling water outlet pipe 31, the cooling water that has cooled the cylinder block 3 is discharged. The cooling water outlet pipe 31 is connected to the EGR cooler 30. The exhaust gas in the EGR cooler 30 is cooled by the cooling water passing through in the cooling water outlet pipe 31.

Figure 3:
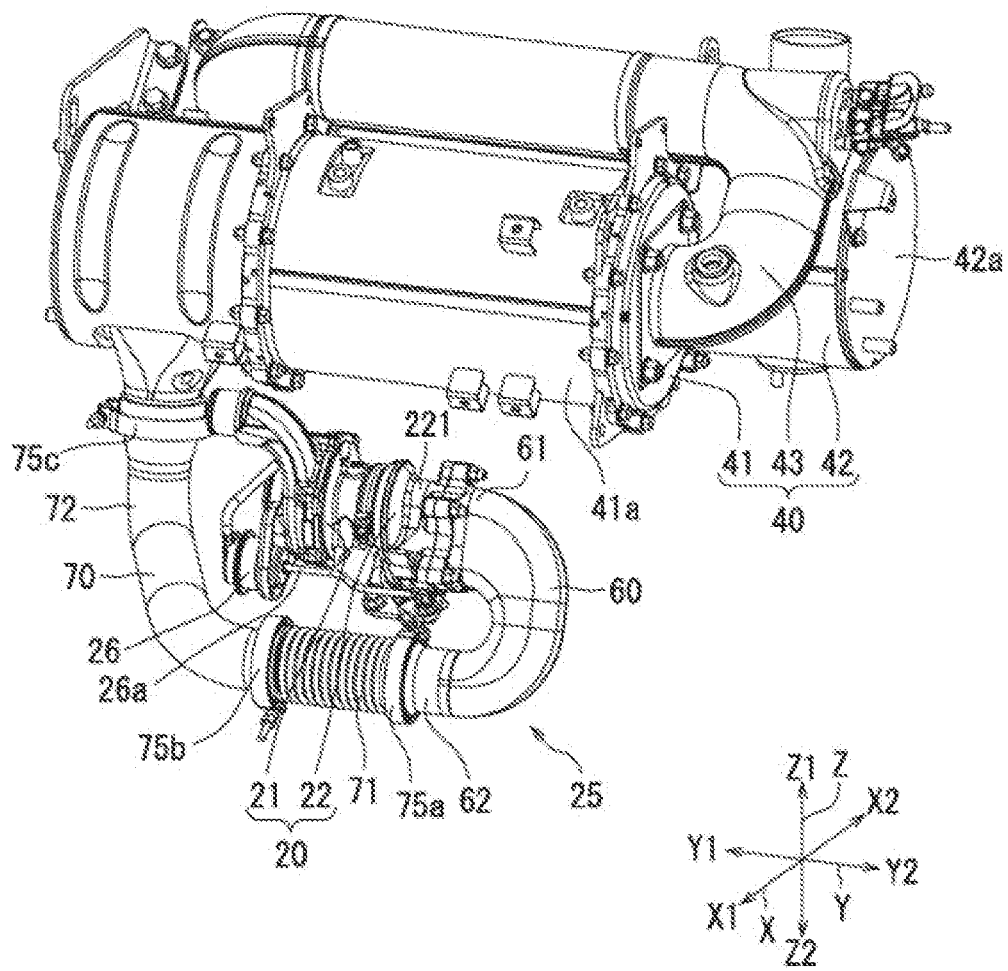
FIG. 3 is a perspective view showing configurations of a turbocharger, exhaust communication pipe, and exhaust gas purifier of the engine of the one embodiment of the present invention.
Figure 4:
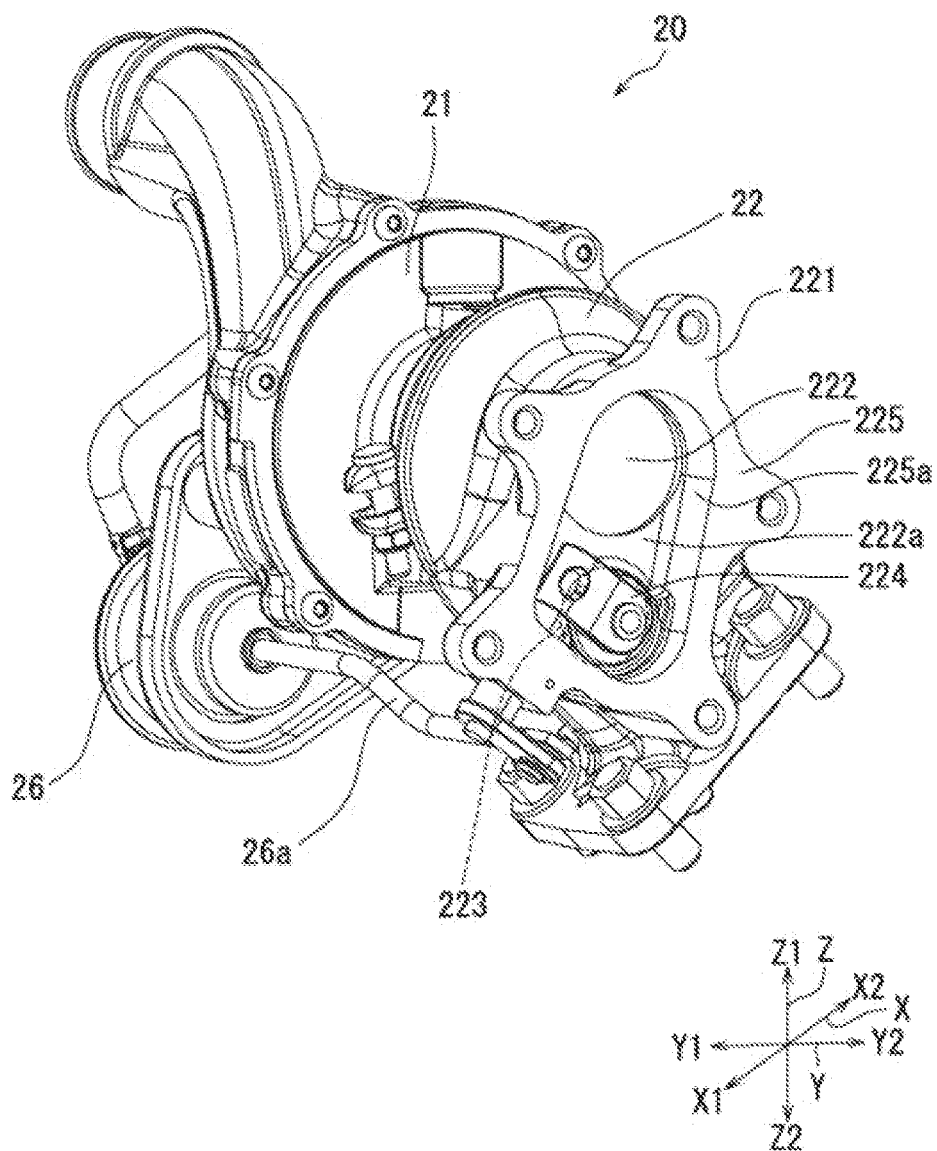
FIG. 4 is a perspective view showing the configuration of the turbocharger of the engine according to the one embodiment of the present invention.

Next, referring to FIGS. 3 to 9, the configuration around the exhaust communication pipe 25 of the engine 1 of the present embodiment will be described. Referring to FIG. 3 and FIG. 4, the configuration of the turbocharger 20 will be described. FIG. 3 is a perspective view showing configurations of the turbocharger 20, exhaust communication pipe 25, and exhaust gas purifier 40 of the engine 1 of the present embodiment. FIG. 4 is a perspective view showing the configuration of the turbocharger 20 of the engine 1 according to the present embodiment.

As shown in FIGS. 3 and 4, the turbocharger 20 has a communication pipe connection portion 221 that is connected to the exhaust communication pipe 25. The communication pipe connection portion 221 is placed at the turbine case 22. As shown in FIG. 4, the turbocharger 20 further has an opening portion 222, a waste gate port (also referred to as a bypass path) 223, and a waste gate valve 224. The opening portion 222 is placed inside the communication pipe connection portion 221. The opening portion 222 is a discharge port that allows exhaust gas to be discharged from inside the turbine case 22 to the exhaust communication pipe 25. The opening portion 222 is circular in shape. In the present embodiment, "circular shape" means a substantially true circular shape.

The waste gate port 223 is placed adjacent to the opening portion 222. In the present embodiment, the opening portion 222 and waste gate port 223 are formed in a same wall portion 222a. The waste gate port 223 is opened and closed by the waste gate valve 224. With an actuating unit 26 having a link mechanism 26a, the waste gate valve 224 opens and closes the waste gate port 223. The waste gate valve 224 opens the waste gate port 223, thereby to prevent the gas pressure in the turbine case 22 from becoming too high.

The communication pipe connection portion 221 has a side wall portion 225 to surround the waste gate port 223 and waste gate valve 224. The side wall portion 225 has an inner peripheral face 225a. The inner peripheral face 225a surrounds the opening portion 222, the waste gate port 223, and the waste gate valve 224. Therefore, the inner peripheral face 225a has a shape that is different from the circular shape. Viewed from the front-rear direction, the inner peripheral face 225a may be a substantially oval or a substantially rectangular shape, for example, but in the present embodiment, has a shape with no symmetrical axis.

Figure 5:
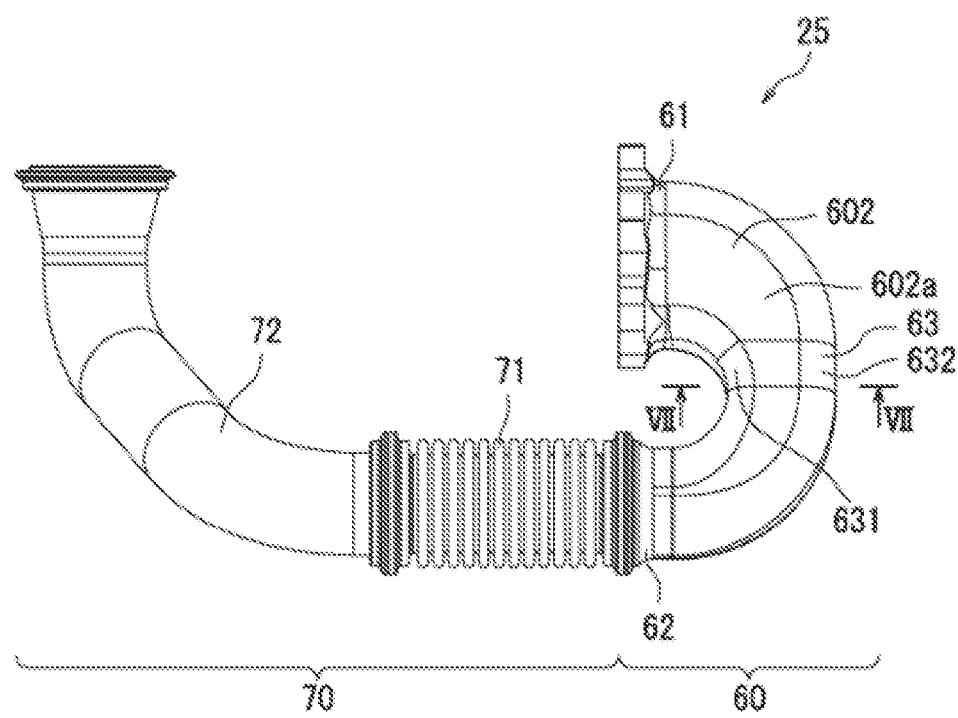
FIG. 5 is a side view showing the configuration of the exhaust communication pipe of the engine of the one embodiment of the present invention.
Figure 5:
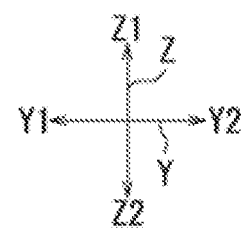
Figure 6:
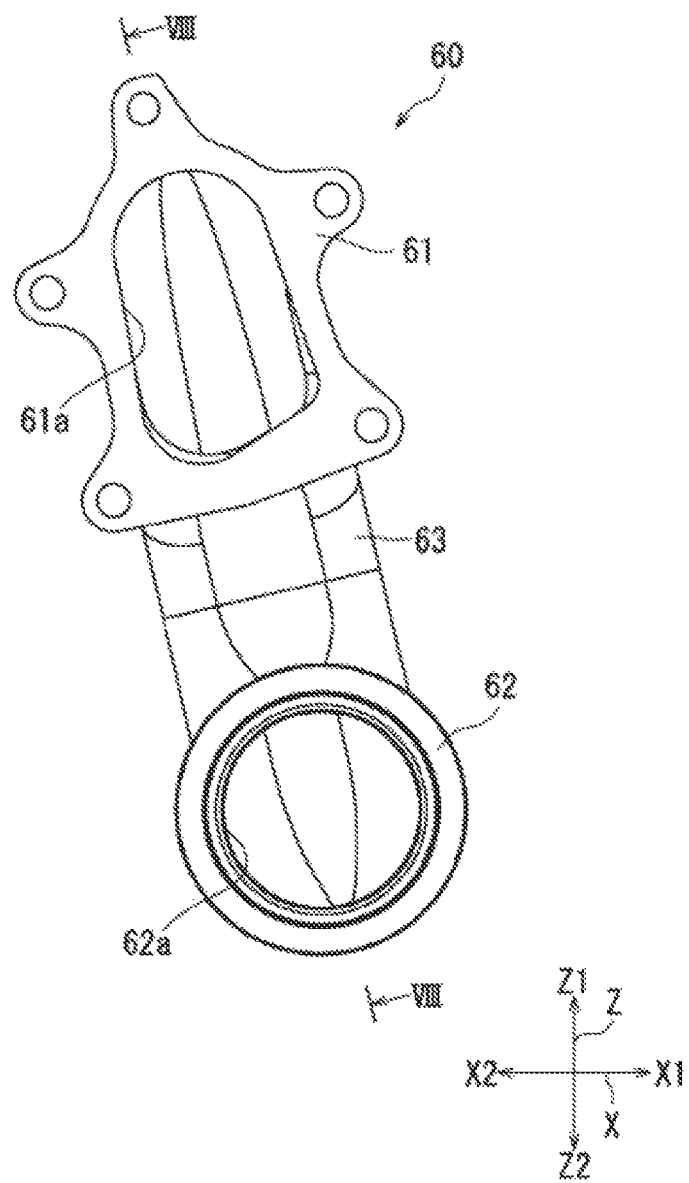
FIG. 6 shows, from the front, a configuration of a first connection member of the engine of the one embodiment of the present invention.

Next, the configuration of the exhaust communication pipe 25 is described referring to FIG. 3 and FIGS. 5 to 8. FIG. 5 is a side view showing the configuration of the exhaust communication pipe 25 of the engine 1 of the present embodiment. FIG. 6 shows, from the front (one side Y1 in the second direction Y), the configuration of a first connection member 60 of the engine 1 of the present embodiment.

As shown in FIGS. 3 and 5, the exhaust communication pipe 25 has the first connection member 60 and a second connection member 70. The first connection member 60 is connected to the turbocharger 20. The second connection member 70 connects the first connection member 60 with the exhaust gas purifier 40. In the present embodiment, the second connection member 70 has a bellows portion 71 and a downstream connection portion 72. The bellows portion 71 and the downstream connection portion 72 are each formed of metal, such as stainless steel. The exhaust communication pipe 25 further has metal connecting bands (also referred to as V-clamps) 75a, 75b and 75c (see FIG. 3). The connecting band 75a connects the first connection member 60 with the bellows portion 71. The connecting band 75b connects the bellows portion 71 with the downstream connection portion 72. The connecting band 75c connects the downstream connection portion 72 with the DPF unit 41 of the exhaust gas purifier 40.

The first connection member 60 is formed by casting, for example. The first connection member 60 has an upstream end portion 61 connected to the turbocharger 20 and a downstream end portion 62 connected to the second connection member 70.

As shown in FIG. 6, the downstream end portion 62 has an inner peripheral face 62a with a circular cross-section. Meanwhile, the upstream end portion 61 has an abnormal shaped inner peripheral face different from that of the inner peripheral face 62a of the downstream end portion 62 61a. Viewed from the front and rear directions, the inner peripheral face 61a is substantially the same in shape as the inner peripheral face 225a (see FIG. 4) of the communication pipe connection portion 221 of the turbocharger 20. Thus, the inner peripheral face of a part of the first connection member 60 has an abnormal shape that is different from a circular shape, while for the inner peripheral face of the second connection member 70 may have a circular shape. Therefore, compared with the case where, for example, the inner peripheral face of the second connection member 70 has the abnormal shape, the pressure loss seen when the exhaust gas passes through the interior of the exhaust communication pipe 25 can be suppressed. The flow path cross-sectional area of the upstream end portion 61 (the area of the region surrounded by the inner peripheral face 61a) is larger than the flow path cross-sectional area (the area of the region surrounded by the inner peripheral face 62a) of the downstream end portion 62.

Figure 7:
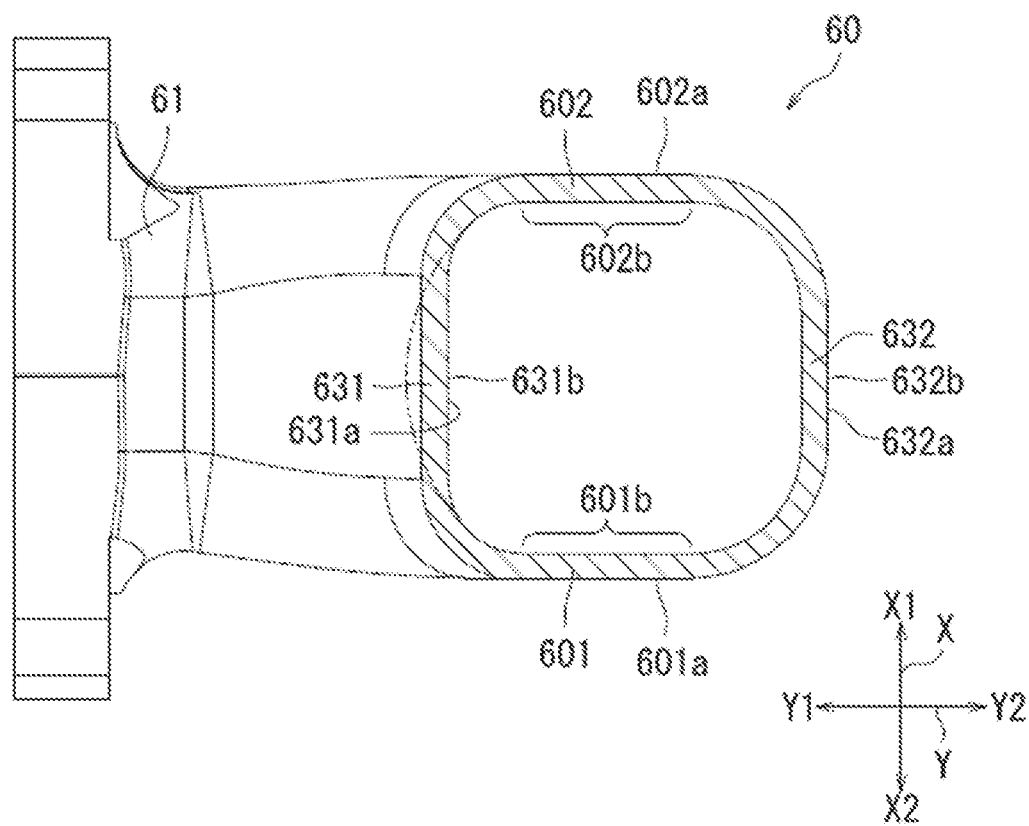
FIG. 7 is a cross-sectional view along the line VII-VII in FIG. 5.

FIG. 7 is a cross-sectional view along the line VII-VII in FIG. 5. As shown in FIG. 7, the first connection member 60 has a right side portion 601 opposing the left side portion 2a of the engine body 2. In the present embodiment, the outer face of the right side portion 601 has a flat portion 601a along the left side portion 2a of the engine body 2. Therefore, the first connection member 60 can be placed closer to the engine body 2, making it possible to prevent the entire engine 1 from becoming larger in the width direction (first direction X). The right side portion 601 is one example of the "second side portion" of the present invention.

Further, the first connection member 60 has a left side portion 602 opposing the right side portion 601. In the present embodiment, the outer face of the left side portion 602 has a flat portion 602a along a flat portion 601a of the right side portion 601. In other words, the outer face of the left side portion 602 has the flat portion 602a along the left side portion 2a of the engine body 2. Thus, the entire engine 1 can be more suppressed from becoming larger in the width direction (first direction X).

In the present embodiment, the right side portion 601 and the left side portion 602 are formed to have a substantially constant thickness. Then, the right side portion 601 and the left side portion 602 include portions 601b and 602b along the left side portion 2a of the engine body 2, respectively.

As shown in FIGS. 5 to 7, in the present embodiment, the first connection member 60 has a curved portion 63 that is placed between the upstream end portion 61 and the downstream end portion 62. The curved portion 63 has an inner portion 631 positioned inside a bend and an outer portion 632 positioned outside the bend. As shown in FIG. 7, an inner face 631a of the inner portion 631 has a cross-section with a linear portion 631b. Therefore, unlike the case where the inner face 631a of the inner portion 631 is formed to protrude inside the bend, for example, as indicated by the two-chained line in FIG. 7, the curvature radius seen when the exhaust gas passes through the curved portion 63 can be prevented from becoming too small. Thus, the exhaust gas flows more smoothly.

An outer face 632a of the outer portion 632 has a cross-section with a linear portion 632b. Thus, unlike the case where the outer face 632a of the outer portion 632 is formed to protrude outside the bend, for example, the length of the first connection member 60 in the second direction Y can be prevented from becoming longer.

In the present embodiment, the inner portion 631 and the outer portion 632 are formed to have a substantially constant thickness. The curved portion 63 has a substantially rectangular cross-section.

Figure 8:
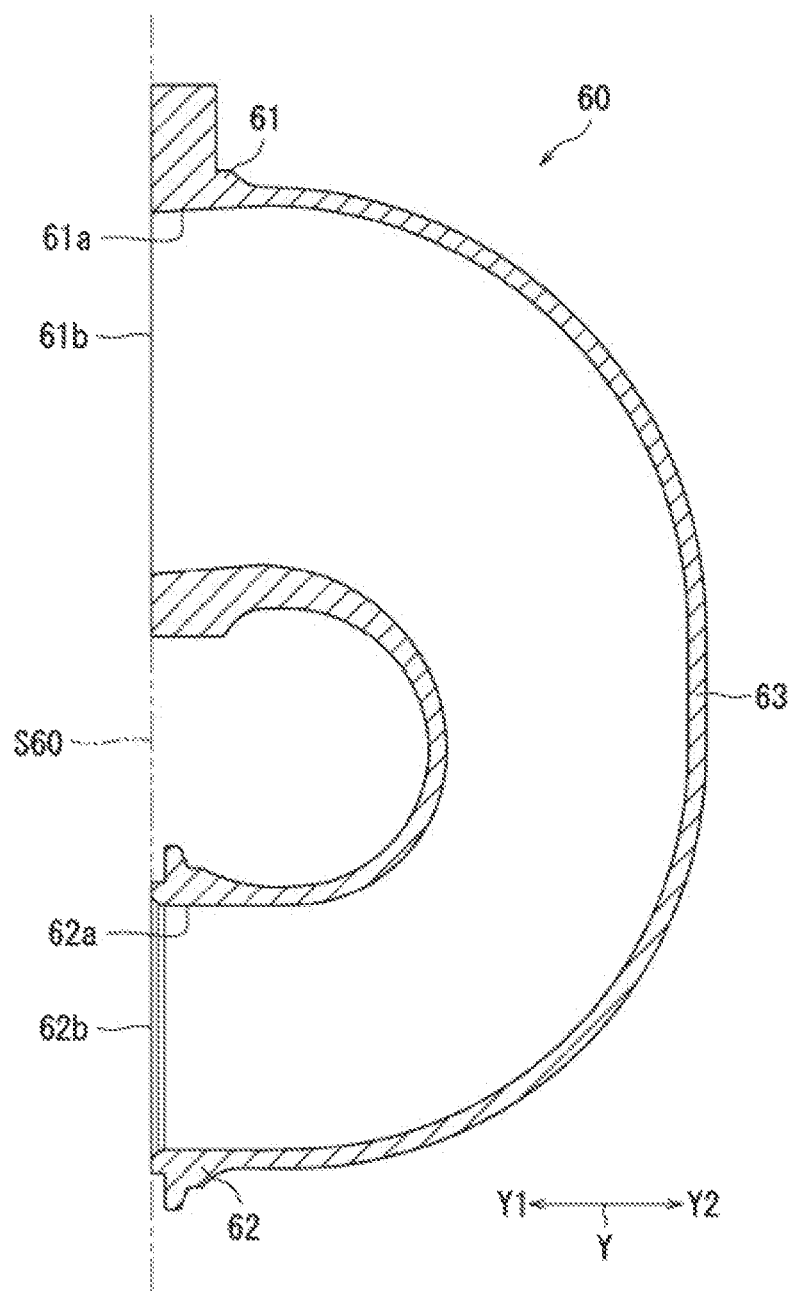
FIG. 8 is a cross-sectional view along the line VIII-VIII in FIG. 6.

FIG. 8 shows a cross-sectional view along the line VIII-VIII in FIG. 6. As shown in FIGS. 5 and 8, the upstream end portion 61 of the first connection member 60 is open in one direction (one side Y1 in the second direction Y). Further, the downstream end portion 62 opens in one direction (one side Y1 in the second direction Y). That is, the first connection member 60 is approximately 180° curved. Thus, when the first connection member 60 expands due to the heat of the exhaust gas when the engine 1 is driven, the upstream portion (here the upper portion) of the first connection member 60 extends rearward (the other side Y2 in the second direction Y) relative to the turbocharger 20, while the downstream portion (here the lower portion) of the first connection member 60 extends forward (one side Y1 in the second direction Y) relative to the curved portion 63. Therefore, an end face 62b of the downstream end portion 62 is suppressed from being displaced in the front-rear direction (second direction Y) relative to an end face 61b of the upstream end portion 61. As a result, the position of the end face 62b of the downstream end portion 62 can be suppressed from moving in the front-rear direction (second direction Y).

In addition, the end face 61b of the upstream end portion 61 and the end face 62b of the downstream end portion 62 are placed on substantially a same plane S60. Therefore, when manufacturing the first connection member 60, the end faces 61b and 62b can be machined at the same time. Further, positional accuracy (manufacturing error) of the end face 62b relative to the end face 61b can be improved. Therefore, when assembling the engine 1, the positional accuracy of the end face 62b relative to the exhaust gas purifier 40 can be improved, thus making it possible to prevent the second connection member 70 from becoming difficult to mount to the exhaust gas purifier 40. This means that the engine 1 is easier to assemble.

In addition, placing, on the same plane S60, the end face 61b of the upstream end portion 61 and the end face 62b of the downstream end portion 62, can more suppress the position of the end face 62b of the downstream end portion 62 from moving in the front-rear direction (in the second direction Y), even when the first connection member 60 expands due to the heat of the exhaust gas at the driving of the engine 1. Therefore, a force applied to the second connection member 70 can be suppressed.

Further, in the present embodiment, as described above, the second connection member 70 has the bellows portion 71 connected to the first connection member 60. The bellows portion 71 is a pipe having a bellows shape. Therefore, the exhaust communication pipe 25's thermal expansion due to hot exhaust gas can be absorbed by the bellows portion 71, thus making it possible to easily prevent the exhaust communication pipe 25 from being damaged.

Figure 9:
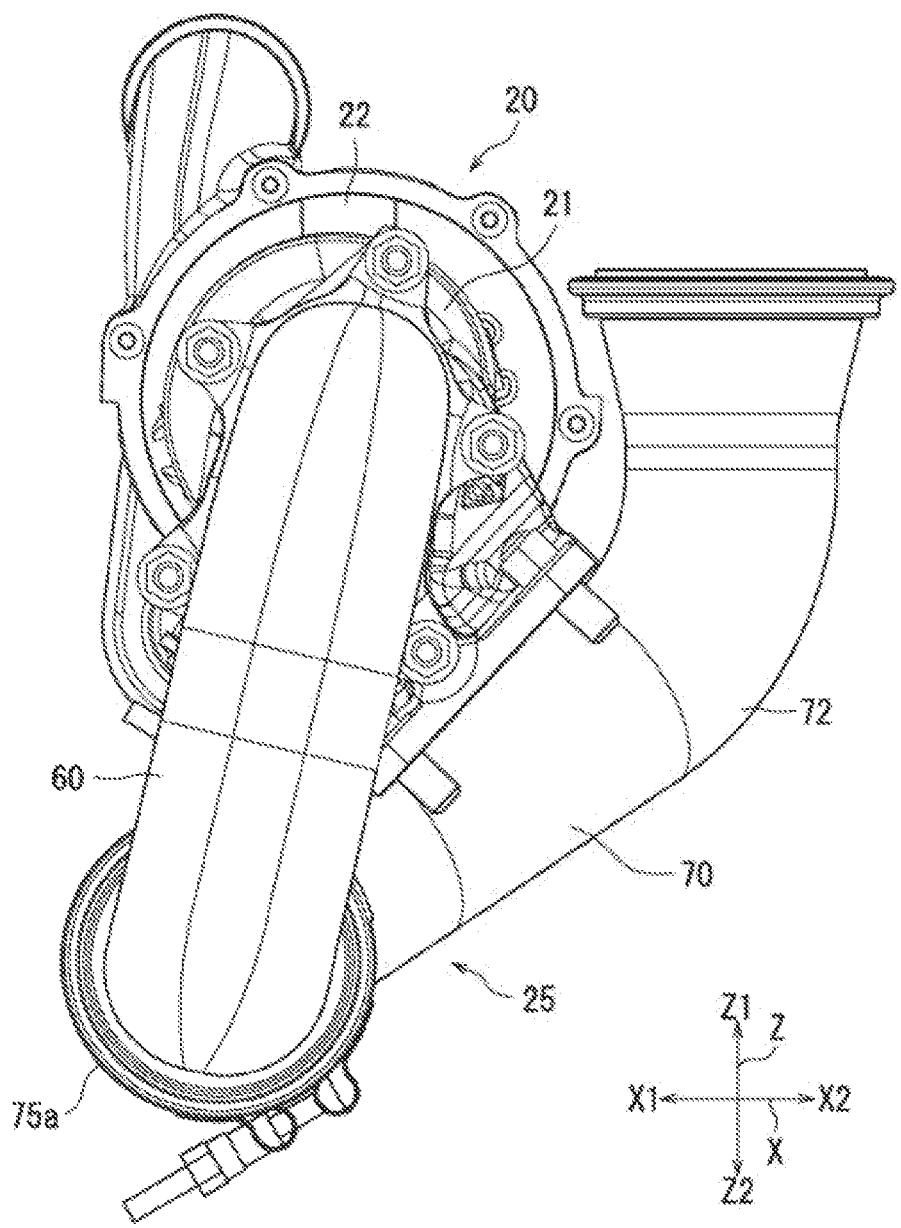
FIG. 9 shows, from the rear, the configurations of the turbocharger and exhaust communication pipe of the engine of the one embodiment of the present invention.

FIG. 9 shows, from the rear (the other side Y2 in the second direction Y), the configurations of the turbocharger 20 and exhaust communication pipe 25 of the engine 1 of the present embodiment. As shown in FIGS. 3 and 9, the second connection member 70 is placed above or below (here below) the turbocharger 20. Thus, compared with the case where the second connection member 70 is placed on the side (one side X1 in the first direction X) of the turbocharger 20, for example, the second connection member 70 can be placed closer to the engine body 2. Thus, the entire engine 1 can be prevented from becoming larger in the width direction (first direction X). In the present embodiment, the entire bellows portion 71 of the second connection member 70 and a part of the downstream connection portion 72 are placed below the turbocharger 20.

The embodiment of the present disclosure has been described hereinabove referring to the drawings. However, the present invention is not limited to the embodiment described above, and can be embodied in various modes within the range not departing from the gist of the present invention. Further, combining a plurality of components disclosed in the above embodiment can form various inventions. For example, some of the components may be removed from all the components shown in the embodiment. In addition, any component across different embodiments may be combined as appropriate. The drawings are schematically shown with each component as a main subject as to facilitate understanding, and the thickness, length, number, space, and the like of each of the shown components may be different from actual ones due to convenience of making the drawings. Further, the material, shape, size, and the like of each of the components shown in the above embodiment are merely examples and are not particularly limited, and various modifications may be made without substantially departing from the effect of the present invention.

For example, the above embodiment shows the example that the upstream end portion 61 of the first connection member 60 opens in the one direction and the downstream end portion 62 opens in the one direction. That is, the example has been shown in which the first connection member 60 is approximately 180° curved, but the present invention is not limited to this. The first connection member 60 may be curved only less than 180° or may be curved more than 180°.

In the above embodiment, the end face 61b of the upstream end portion 61 of the first connection member 60 and the end face 62b of the downstream end portion 62 of the first connection member 60 are placed on substantially the same plane S60, but the present invention is not limited to this. The end face 61b of the upstream end portion 61 of the first connection member 60 and the end face 62b of the downstream end portion 62 of the first connection member 60 may not be placed on the same plane S60.

In the above embodiment, the example has been shown in which the second connection member 70 includes two pipes (bellows portion 71 and downstream connection portion 72), but the present invention is not limited to this. The second connection member 70 may include one pipe, or three or more pipes.

In the above embodiment, the pipes (first connection member 60, bellows portion 71, and downstream connection portion part 72) included in the exhaust communication pipe 25 are connected using the connecting bands 75a and 75b, but the present invention is not limited to this. For example, the pipes may be connected by being welded together.

In the above embodiment, the example of fixing the exhaust gas purifier 40 to the engine body 2 has been shown, but the present invention is not limited to this. The engine body 2 and the exhaust gas purifier 40 may be separately fixed to the chassis.

INDUSTRIAL APPLICABILITY

The present invention is useful in the field of an engine.

REFERENCE SIGNS LIST

1: engine
2: engine body
2a: left side portion (first side portion)
20: turbocharger
25: exhaust communication pipe
40: exhaust gas purifier (after-treatment unit)
60: first connection member
61: upstream end portion
61a: inner peripheral face
61b: end face
62: downstream end portion
62a: inner peripheral face
62b: end face
63: curved portion
70: second connection member
71: bellows portion
221: communication pipe connection portion
222: opening portion
223: waste gate port
224: waste gate valve
225a: inner peripheral face
601: right side portion (second side portion)
601a: flat portion
631: inner side portion
631a: inner face
631b: linear portion
S60: same plane

The invention claimed is:

1. An engine comprising:
an engine body;
a turbocharger connected to the engine body;
an after-treatment unit that purifies exhaust gas discharged from the turbocharger; and
an exhaust communication pipe that connects the turbocharger with the after-treatment unit,
wherein
the exhaust communication pipe includes:
a first connection member that is connected to the turbocharger, and
a second connection member that connects the first connection member with the after-treatment unit,
a downstream end portion of the first connection member has an inner peripheral face having a cross-section of a circular shape, and
an upstream end portion of the first connection member has an inner peripheral face having a cross-section of a shape that is different from the inner peripheral face of the downstream end portion, and
the downstream end portion is connected to the second connection member, and the upstream end portion is connected to the turbo charger.

2. The engine as claimed in claim 1, wherein,
the engine body has a first side portion on which the turbocharger is placed,
the first connection member has a second side portion opposing the first side portion, and
an outer face of the second side portion has a flat portion along the first side portion.

3. The engine as claimed in claim 1, wherein
the first connection member has a curved portion placed between the upstream end portion and the downstream end portion,
the curved portion has an inner portion positioned inside a bend, and
an inner face of the inner portion has a cross-section with a linear portion.

4. The engine as claimed in claim 1, wherein
the first connection member has a curved portion that is placed between the upstream end portion and the downstream end portion,
the upstream end portion opens in one direction,
the downstream end portion opens in the one direction, and
the second connection member is placed above or below the turbocharger.

5. The engine as claimed in claim 4, wherein
an end face of the upstream end portion and an end face of the downstream end portion are placed on a substantially same plane.

6. The engine as claimed in claim 4, wherein
the second connection member has a bellows portion in a shape of a bellows connected to the downstream end portion of the first connection member, and
the bellows portion is placed above or below the turbocharger.

7. The engine as claimed in claim 1, wherein
the after-treatment unit is fixed to the engine body.

8. The engine according to claim 1, wherein
the turbocharger has:
a communication pipe connection portion connected to the exhaust communication pipe,
an opening portion which is placed inside the communication pipe connection portion, and through which the exhaust gas passes, and
a waste gate port which is adjacent to the opening portion and which is opened and closed by a waste gate valve, and
the communication pipe connection portion has an inner peripheral face having a cross-section of a shape that is different from a circular shape.

9. An engine comprising:
an engine body;
a turbocharger connected to the engine body;
an after-treatment unit that purifies exhaust gas discharged from the turbocharger; and
an exhaust communication pipe that connects the turbocharger with the after-treatment unit,
wherein the turbocharger has a communication pipe connection portion, the exhaust communication pipe includes:

a first connection member that is connected to the turbocharger, and a second connection member that connects the first connection member with the after-treatment unit, a downstream end portion of the first connection member has an inner peripheral face having a cross-section of a circular shape, and an upstream end portion of the first connection member and the communication pipe connection portion have an inner peripheral face respectively, each inner peripheral face having a cross-section of a shape that is different from the inner peripheral face of the downstream end portion.

* * * * *